United States Patent
Magoto et al.

(10) Patent No.: US 6,904,641 B2
(45) Date of Patent: Jun. 14, 2005

(54) ADJUSTABLE ECCENTRIC AXLE CASTER ASSEMBLY FOR PALLET TRUCK

(75) Inventors: Daniel Carl Magoto, Russia, OH (US); David Allen Letchworth, LaGrange, NC (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 10/391,701

(22) Filed: Mar. 18, 2003

(65) Prior Publication Data

US 2004/0181901 A1 Sep. 23, 2004

(51) Int. Cl.[7] .............................................. B60B 33/04
(52) U.S. Cl. ..................... 16/19; 16/DIG. 34; 280/43.22
(58) Field of Search ................... 16/19, 18 A, DIG. 34; 280/43.12, 43.17, 43.13, 43.24, 43.22, 86.753; 411/398

(56) References Cited

U.S. PATENT DOCUMENTS

| | | | |
|---|---|---|---|
| 2,065,071 A | | 12/1936 | Harris |
| 3,163,441 A | | 12/1964 | Traugott |
| 3,334,911 A | * | 8/1967 | Enters .......................... 280/43 |
| 3,534,974 A | * | 10/1970 | Jervard et al. ........... 280/43.24 |
| 3,618,966 A | * | 11/1971 | Vandervest .............. 280/43.17 |
| 3,685,851 A | * | 8/1972 | Berry ....................... 280/43.22 |
| 3,880,444 A | * | 4/1975 | Bridges ................. 280/86.753 |
| 4,677,707 A | * | 7/1987 | Holler ........................ 16/239 |
| 4,753,454 A | * | 6/1988 | Woehler ................ 280/86.755 |
| 5,104,141 A | * | 4/1992 | Grove et al. ........... 280/86.753 |
| 5,163,699 A | * | 11/1992 | Specktor ................ 280/86.753 |
| 5,366,232 A | * | 11/1994 | Pozzobon et al. ..... 280/11.223 |
| 5,470,190 A | | 11/1995 | Bamford et al. |
| 5,749,121 A | * | 5/1998 | Loescher ....................... 16/43 |
| 6,068,275 A | * | 5/2000 | Chino ................. 280/124.112 |
| 6,106,441 A | * | 8/2000 | Chen ........................... 482/57 |
| 6,302,416 B1 | * | 10/2001 | Schmack ............... 280/93.512 |
| 6,322,153 B1 | * | 11/2001 | Lund ........................ 301/5.304 |
| 6,371,500 B1 | | 4/2002 | Goddard |
| 6,409,189 B1 | * | 6/2002 | Orimoto et al. ....... 280/86.751 |
| 6,503,039 B2 | * | 1/2003 | Ward .......................... 411/427 |
| 6,550,795 B1 | * | 4/2003 | Schlosser et al. ........ 280/86.75 |

* cited by examiner

Primary Examiner—Suzanne Dino Barrett
Assistant Examiner—Mark Williams
(74) Attorney, Agent, or Firm—Stevens & Showalter LLP

(57) ABSTRACT

An adjustable eccentric axle caster assembly for a pallet truck is provided. The adjustable caster assembly includes an eccentric axle, a caster wheel mounted on the eccentric axle, and a fastener for securing the eccentric axle to provide a desired caster wheel position. Additionally, a method of adjusting the eccentric axle caster assembly is provided.

11 Claims, 2 Drawing Sheets

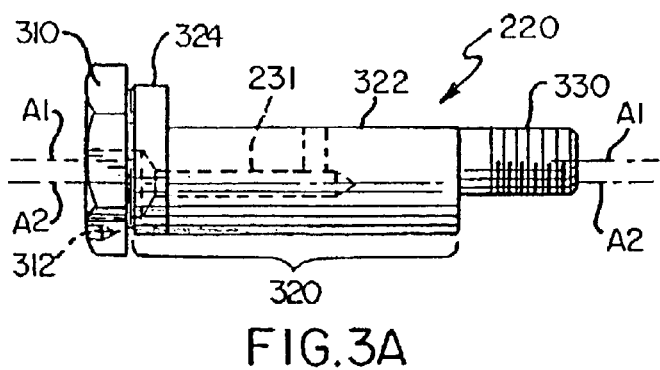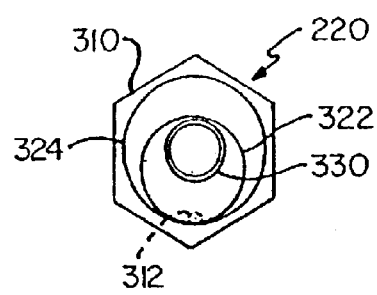
FIG.3A  FIG.3B
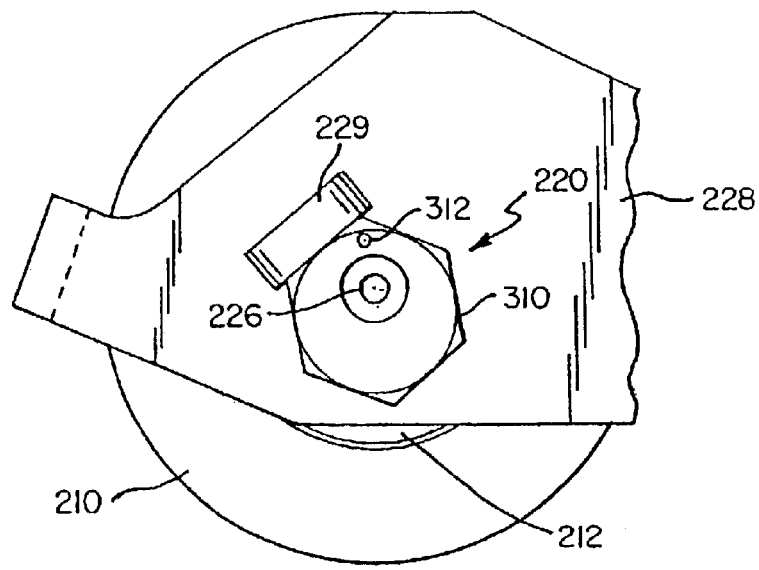
FIG.4A
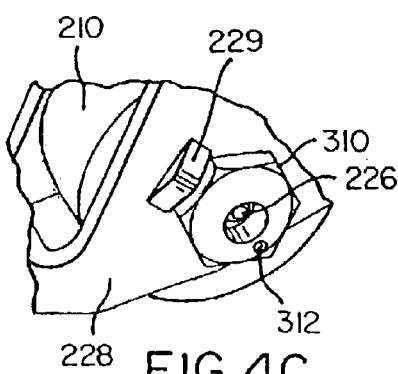
FIG.4C
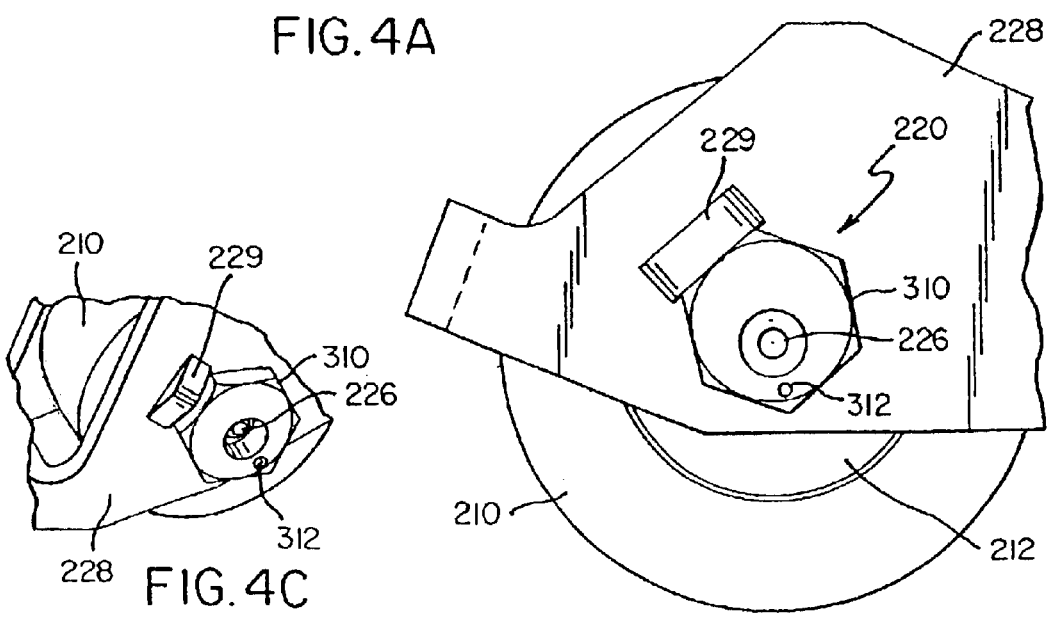
FIG.4B

ADJUSTABLE ECCENTRIC AXLE CASTER ASSEMBLY FOR PALLET TRUCK

The invention of the present application relates in general to pallet trucks commonly used for picking stock in large warehouses and, more particularly, to an adjustable eccentric axle caster assembly for such a pallet truck. A method of adjusting the eccentric axle caster assembly is also provided. While the eccentric axle caster assembly is generally applicable to a variety of pallet trucks, it will be described herein with reference to an end controlled walkie/rider pallet truck.

BACKGROUND OF THE INVENTION

A typical walkie/rider pallet truck includes load carrying forks and a power unit having a steerable wheel. The steerable wheel is typically driven by a traction motor coupled to the steerable wheel by a transmission, also included in the power unit, and is steered by a handle mounted at the end of a movable steering arm coupled to the steerable wheel. In addition to the steerable wheel, the walkie/rider pallet truck is also supported by a pair of caster wheels or casters. The casters are preferably heavy-duty, all steel, spring loaded, articulating casters. The casters provide stability that leads to operator confidence which translates into higher levels of productivity and safety. When properly adjusted, the casters provide good lateral stability, especially when making turns. Properly adjusted casters also provide reduced drive/load/caster wheel wear. Finally, properly adjusted casters enable optimum handling, braking and traction.

To optimize and maintain truck performance, the casters must be adjusted periodically to account for tire wear and replacement. Conventionally, periodic height adjustment of the casters involves a tedious, time-consuming process of inserting or removing shims around the caster mounting bracket to obtain the correct height adjustment. Shims required for adjustment must be located and the caster mount assembly taken apart or loosened so that the required shim(s) can be inserted in or removed from the appropriate locations. Then the caster mount assembly must be reassembled. Due to the labor-intensive and cumbersome adjustment process using shims, adjustment may be delayed leading to less than optimum levels of productivity during these delayed adjustment periods. Further, if the shims are lost, the additional effort of obtaining replacement parts makes adjustment even more cumbersome.

Accordingly, there is a need for an adjustable caster assembly which does not have the problems listed above.

SUMMARY OF THE INVENTION

This need is met by the invention of the present application wherein an adjustable eccentric axle caster assembly for a pallet truck is provided. The adjustable caster assembly includes an eccentric axle, a caster wheel mounted on the eccentric axle, and a fastener for securing the eccentric axle in a plurality of angular orientations to provide a desired caster wheel height position. Additionally, a method of adjusting the eccentric axle caster assembly is provided.

Additional features and advantages of the present invention will be apparent from the following description, the appended claims and the accompanying drawings.

BRIEF DESCRIPTION OF THE DRAWINGS

FIG. 3A is a side view of the eccentric axle shown in FIG. 2;

FIG. 3B is an end view of the eccentric axle shown in FIG. 2;

FIGS. 4A and 4B show the eccentric axle positioned in minimum and maximum height adjustment positions, respectively; and FIG. 4C is a perspective view of a portion of the adjustable eccentric axle caster assembly showing an abutment surface engaged by one of the flat surfaces of a head of an eccentric axle to provide known adjustment positions.

DETAILED DESCRIPTION OF THE INVENTION

Figure 1:
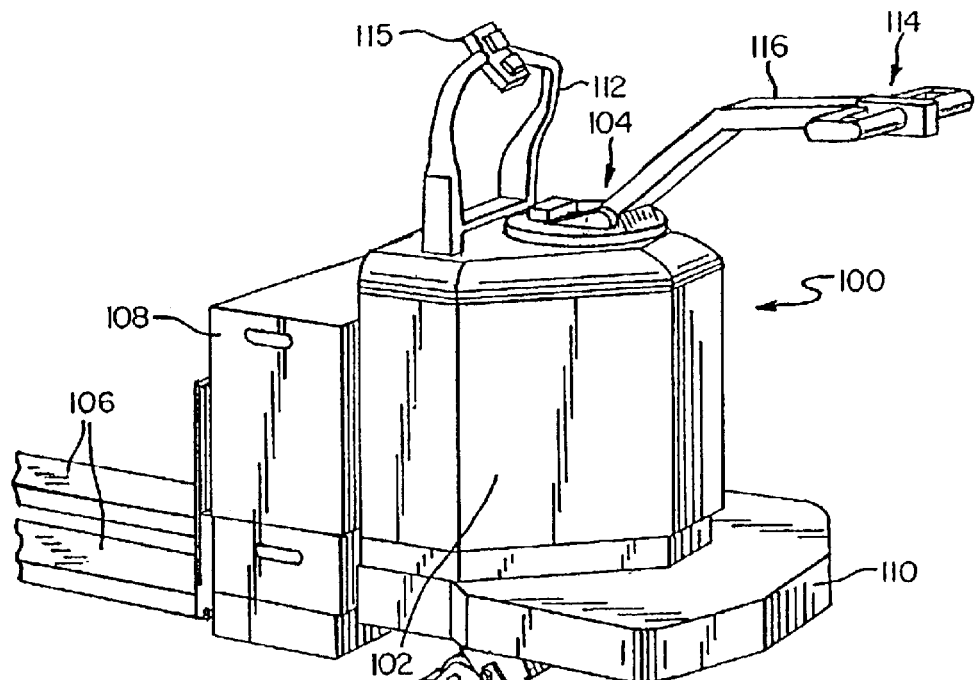
FIG. 1 is a perspective view of a walkie/rider pallet truck including the adjustable eccentric axle caster assembly of the present invention.

While the inventions of the present application are generally applicable to a variety of pallet trucks, they will be described herein with reference to an end controlled walkie/rider pallet truck. Referring now to the drawings, in which like-referenced characters indicate corresponding elements throughout the several views, attention is first drawn to FIG. 1 which illustrates a walkie/rider pallet truck 100 including the eccentric axle caster assembly of the present application. The truck 100 includes a power unit 102, a steering control unit 104, and load carrying forks 106 (partially shown) that extend rearwardly from the power unit 102. The power unit 102 contains a steerable drive wheel assembly (not shown), usually located directly beneath the steering control unit 104; two adjustable eccentric axle caster assemblies 120 (only one of which is shown due to the angle of view); an electric traction motor (not shown); and, an electric storage battery 108. As is conventional, the steerable wheel is driven by the traction motor for propelling the walkie/rider pallet truck 100.

The power unit 102 also includes a platform 110 onto which an operator may step and ride while controlling the truck 100. A hand rail or grab bar 112 is provided for an operator to grip while riding on the platform 110. A control panel 115 is mounted on the grab bar 112. The steering control unit 104 includes a handle 114 mounted at the distal end of a steering arm 116 that is pivotally mounted to the steering control unit 104. The operator uses the handle 114 to control steering, braking and other truck functions.

Figure 2:
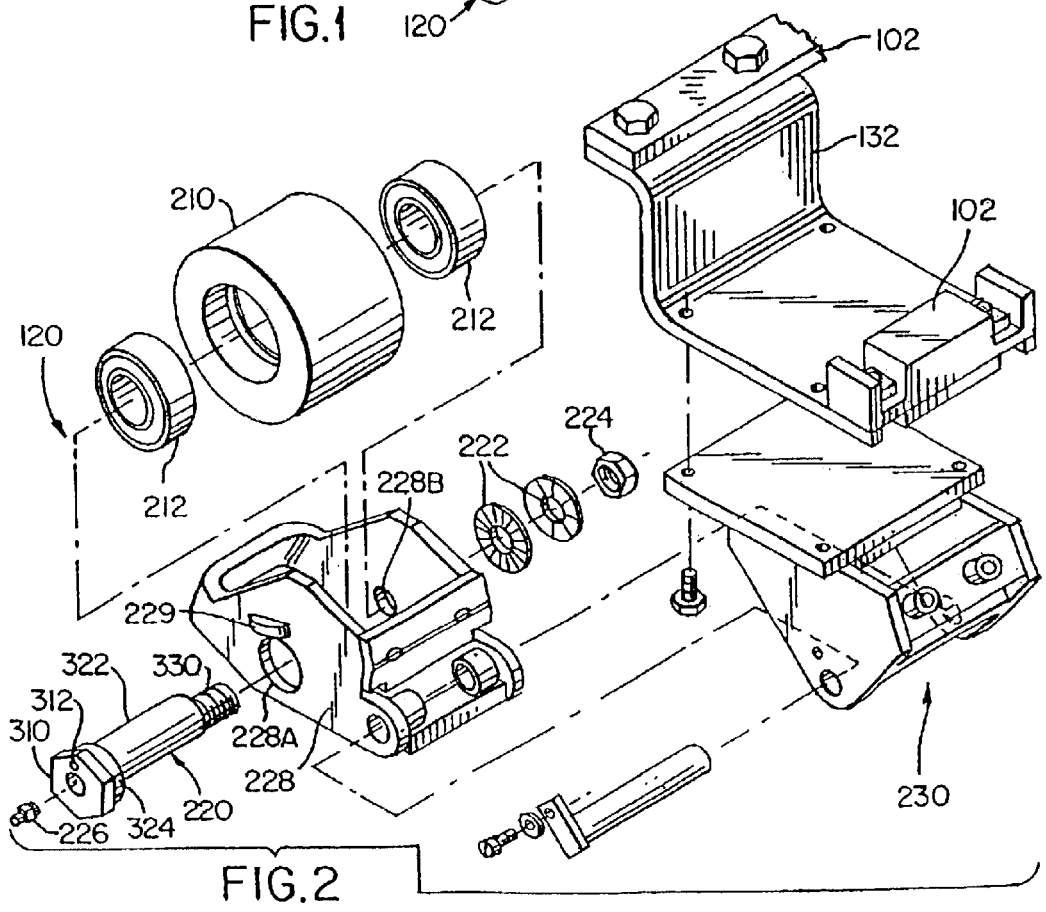
FIG. 2 is an exploded view of the adjustable eccentric axle caster assembly shown in FIG. 1.

Referring to FIG. 2, an exploded view of the adjustable eccentric caster assembly 120 is shown. The adjustable eccentric caster assembly 120 includes a caster wheel 210, bearings 212, an eccentric axle 220 (shown in greater detail in FIGS. 3A and 3B), wedge washers 222 (commercially available from Nord-Lock, see http://www.nord-lock.com), a fastener 224, a lubrication fitting 226, a caster shroud assembly 228 and a caster mount assembly 230. The caster wheel 210 may be formed of a plastic material. The bearings 212 as illustrated include flanges to eliminate the need for spacer washers. The fastener 224 is illustrated as a nut. The eccentric axle 220 includes paths 231 (shown by dashed lines in FIG. 3A) for lubrication flow from the lubrication fitting 226 as is conventional. The caster shroud assembly 228 includes first and second apertures 228A, 228B, which receive the eccentric axle 220, and a projection 229 for securing the rotational position of the eccentric axle 220 in one of a plurality of rotational positions as described in greater detail below. The caster shroud assembly 228 is pivotally mounted to the caster mount assembly 230 in a conventional manner. The caster mount assembly 230 includes a caster mounting bracket 132 which bolts to the power unit 102 as is conventional.

Referring to FIGS. 3A and 3B, detailed side and end views of the eccentric axle 220 are shown, respectively. The eccentric axle 220 includes a bolt head 310, a body 320 and a fastening portion 330. The eccentric axle 220 is preferably formed of conventional steel screw stock including a commercially available nitrotec® treatment to provide improved strength, corrosion resistance, oil retention, wear resistance, etc. (nitrotec is a registered service mark of SENIOR HEAT TREATMENT LIMITED, 39–43 BILTON WAY, LUTON BEDFORDSHIRE, ENG LU11UU, United Kingdom). The body 320 includes a concentric cylindrical body portion 324, concentric with the bolt head 310 and the fastening portion 330, sized to fit the first aperture 228A in the caster shroud assembly 228; and an eccentric cylindrical body portion 322, eccentric with the bolt head 310 and the fastening portion 330, sized to fit inside the bearings 212. The fastening portion 330 is illustrated as being threaded to receive the fastener 224 and is sized to pass through the second aperture 228B in the caster shroud assembly 228 opposite the first aperture 228A that receives the concentric body portion 324.

The concentric body portion 324 and the fastening portion 330 have a common center line axis A1 while the center line axis A2 of the cylindrical eccentric body portion 322 is offset as shown in FIG. 3A. As illustrated, the head 310 includes a visual indicator 312 that indicates the rotational position of the body 320 when the eccentric axle 220 is installed in the caster shroud assembly 228. The head 310 is illustrated as being formed as a hexagon, to define six flat adjustment surfaces. However, other head shapes can be used where needed to define a desired number of adjustment surfaces more or less than six. The visual indicator 312 is illustrated as a circular bore, formed for example by drilling, however, it may be formed as an indentation or may be any other appropriately durable marking for indicating the position of the rotational position of the body 320 of the eccentric axle 220.

In the illustrated embodiment, the eccentric body portion 322 is nominally 2.758 inches in length, having a nominal diameter of 0.9830 inches while the concentric body portion 324 is nominally 0.375 inches in length, having a nominal diameter of 1.356 inches. The fastening portion 330 is nominally 1.12 inches in length. The threads of the fastening portion 330 may be any size to mate with the fastener 224. In the illustrated embodiment, the eccentric axle 220 provides a nominal 0.373 inch maximum offset along with two intermediate offsets and a minimum offset.

In addition to the illustrated embodiment described above, it is understood that a wide range of suitable shapes of varying dimensions may be used in accordance with the present invention as will be apparent to those skilled in the art. For example, various fasteners may be used to secure the eccentric axle 220 to the caster shroud assembly 228.

FIGS. 4A and 4B show the eccentric axle 220 positioned in minimum and maximum positions, respectively. The projection 229 of the caster shroud assembly 228 defines an abutment surface which one of the flat surfaces of the head 310 of the eccentric axle 220 engages to provide known adjustment positions and to securely position the eccentric axle to prevent the eccentric axle 220 from rotating during operation of the walkie/rider pallet truck 100 and thereby altering the desired caster height adjustment.

FIG. 4A shows the eccentric axle 220 positioned so that the caster wheel is moved up into the caster shroud assembly 228 as far as possible. This adjustment may tend to decrease the caster load and the stability/handling performance while increasing the drive tire load, the traction/brake performance, and the steer effort.

FIG. 4B shows the eccentric axle 220 positioned so that the caster wheel is moved down, extending below the caster shroud assembly 228 as far as possible. This adjustment may tend to increase the caster load and the stability/handling performance while decreasing the drive tire load, the traction/brake performance, and the steer effort. Additionally, in the illustrated embodiment described above, two other intermediate adjustment positions are provided so that the optimal adjustment can be achieved for varied operating and caster wheel wear conditions with much less effort than the previous process using shims to adjust the caster wheel position.

In accordance with the present invention, in order to adjust the caster wheel position as desired, a technician or other responsible person (hereinafter referred to as the technician) first removes the weight of the pallet truck from the caster assembly and loosens the fastener 224 from the eccentric axle 220 on which the caster wheel 210 is mounted. Then the technician axially moves the eccentric axle 220 from a fixed position wherein a flat surface of the head 310 is engaged with the projection 229 to an adjustment position, wherein the head 310 is free of the projection 229 so that the eccentric axle 220 can be rotated. In this regard, it is noted that the concentric body portion 324 and the non-threaded portion of the fastening portion 330 are sized so that they remain engaged with openings 228A and 228B, respectively, when the eccentric axle 220 is in the adjustment position, see FIGS. 2 and 4C. The eccentric axle 220 is next rotated to the desired position wherein one of the flat surfaces of the head 310 is aligned with the projection 229. The visual indicator 312 may be used to assist in selection of the desired position. The eccentric axle 220 is axially moved from the adjustment position to the fixed position with the aligned one of the flat surfaces of the head 310 engaging the projection 229 and secured in that fixed position by tightening the fastener 24 to maintain the newly selected desired position. While performing the adjustment method of the present application, it is necessary to remove the weight of the pallet truck from the caster assembly, for example by supporting the pallet truck with jacks, hoists or other conventional support mechanisms.

Having thus described the invention of the present application in detail and by reference to preferred embodiments thereof, it will be apparent that variations and modifications are possible without departing from the scope of the invention defined in the appended claims.

What is claimed is:

1. An adjustable caster assembly for a pallet truck comprising:

an eccentric axle having a head, a concentric body portion, an eccentric body portion and a fastening portion, the head defining a plurality of flat engagement surface for positioning the eccentric axle in a corresponding plurality of caster wheel adjustment position;

a caster wheel mounted on the eccentric axle;

a fastener for securing the eccentric axle to provide a desired caster wheel position; and a caster shroud assembly having a projection extending in the same direction as the eccentric axle and defining an abutment surface which is one of the plurality of flat engagement surfaces of the head of the eccentric axle engages when the eccentric axle is secured by moving the eccentric axle axially so that a desired caster wheel position is achieved.

2. The adjustable caster assembly of claim 1 wherein the fastener comprises a nut.

3. The adjustable caster assembly of claim 1 wherein the head of the eccentric axle includes a visual indicator for indicating the position of the eccentric body portion of the eccentric axle and thereby caster wheel position.

4. The adjustable caster assembly of claim 3 wherein the fastener comprises a nut.

5. The adjustable caster assembly of claim 3 wherein the visual indicator comprises an indentation formed into the head in alignment with an axis of the eccentric body portion.

6. An adjustable caster assembly for a pallet truck comprising:

an eccentric axle having a head defining a plurality of flat engagement surfaces, a concentric body portion, an eccentric body portion, and a threaded fastening portion;

a caster wheel mounted on the eccentric body portion of the eccentric axle;

a caster shroud assembly which receives the concentric body portion and the threaded fastening portion of the eccentric axle, the caster shroud assembly having a projection extending in the same direction as the eccentric axle, one of the flat engagement surfaces of the head of the eccentric axle engaging the protection when the eccentric axle is move axially and secured to the shroud assembly; and a fastener for securing the eccentric axle to provide a desired caster wheel position.

7. A method for adjusting the position of a caster wheel of a pallet truck comprising:

mounting the caster wheel on an eccentric axle;

providing an eccentric axle head having a plurality of flat engagement surfaces to define a corresponding plurality of adjustment positions for the eccentric axle;

providing a caster shroud for receiving the eccentric axle;

providing a projection on the caster shroud, the projection extending in the direction of the eccentric axle to engage one of the flat engagement surfaces of the axle head after the eccentric axle is moved axially to thereby maintain the eccentric axle in one of the plurality of adjustment position for the eccentric axle;

rotating the eccentric axle to a desired caster wheel position corresponding to one of the plurality of adjustment positions for the eccentric axle; and securing a fastener to the eccentric axle to secure the eccentric axle in a fixed position to maintain the desired caster wheel position.

8. The method of claim 7 including using an indicator on a head of the eccentric axle to indicate caster wheel position.

9. The method of claim 7 further comprising:

forming the eccentric axle to have a concentric portion and a fastening portion engaged by the fastener to secure the eccentric axle in the fixed position, the concentric portion and the fastening portion being sized to support the eccentric axle for rotation when moved to an adjustment position wherein the head of the eccentric axle can be rotated past the projection;

loosening the fastener;

moving the eccentric axle to the adjustment position for rotating the eccentric axle;

moving the eccentric axle to the fixed position; and securing the eccentric axle in the fixed position.

10. A method for adjusting the position of a caster wheel of a pallet truck comprising:

mounting the caster wheel on an eccentric axle;

loosening a fastener on the eccentric axle;

moving the eccentric axle axially so that a bolt head of the eccentric axle is free of a projection that engages a flat surface of the bolt head of the eccentric axle when the eccentric axle is in a fixed position;

rotating the eccentric axle to provide a desired caster wheel position;

moving the eccentric axle axially so that a flat surface of the bolt head of the eccentric axle corresponding to the desired caster wheel position is engaged by the projection; and securing the eccentric axle in a fixed position to maintain the desired caster wheel position.

11. The method of claim 10 further comprising using an indicator on the bolt head of the eccentric axle to determine the desired caster wheel position.

* * * * *

UNITED STATES PATENT AND TRADEMARK OFFICE
CERTIFICATE OF CORRECTION

PATENT NO. : 6,904,641 B2  Page 1 of 1
DATED : June 14, 2005
INVENTOR(S) : Magoto et al.

It is certified that error appears in the above-identified patent and that said Letters Patent is hereby corrected as shown below:

<u>Column 4,</u>
Line 56, "engagement surface for positioning" should read -- engagement surfaces for positioning --;

<u>Column 5,</u>
Line 26, "axle engaging the protection" should read -- axle engaging the projection --.

Signed and Sealed this

Twenty-second Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,904,641 B1
DATED : June 14, 2005
INVENTOR(S) : D. Magoto et al.

It is certified that error appears in the above-identified patent and that said Letters Patent is hereby corrected as shown below:

Column 4,
Line 57, "caster wheel adjustment position" should read -- caster wheel adjustment positions; --;
Line 63, "abutment surface which is one" should read -- abutment surface which one --;
Line 66, "axially so that" should read -- axially, so that --;

Column 5,
Line 27, "axle is move axially" should read -- axle is moved axially --.

Signed and Sealed this

Twenty-first Day of February, 2006

JON W. DUDAS
*Director of the United States Patent and Trademark Office*